United States Patent
Banerjea

(10) Patent No.: US 10,142,778 B2
(45) Date of Patent: Nov. 27, 2018

(54) DIRECTION FINDING FOR LEGACY BLUETOOTH DEVICES

(71) Applicant: Qualcomm Technologies International, Ltd., Cambridge (GB)

(72) Inventor: Raja Banerjea, San Jose, CA (US)

(73) Assignee: QUALCOMM TECHNOLOGIES INTERNATIONAL, LTD., San Diego, CA (US)

( * ) Notice: Subject to any disclaimer, the term of this patent is extended or adjusted under 35 U.S.C. 154(b) by 43 days.

(21) Appl. No.: 14/990,482

(22) Filed: Jan. 7, 2016

(65) Prior Publication Data

US 2017/0201859 A1    Jul. 13, 2017

(51) Int. Cl.

| | |
|---|---|
| *H04W 4/02* | (2018.01) |
| *H04W 4/80* | (2018.01) |
| *G01S 3/48* | (2006.01) |
| *H04B 7/08* | (2006.01) |
| *H04B 17/27* | (2015.01) |

(52) U.S. Cl.
CPC ............. *H04W 4/023* (2013.01); *G01S 3/48* (2013.01); *H04B 7/0805* (2013.01); *H04B 7/086* (2013.01); *H04B 17/27* (2015.01); *H04W 4/80* (2018.02)

(58) Field of Classification Search
CPC ....... H04W 4/023; H04W 4/008; H04W 4/80; H04B 17/27; H04B 7/0805; H04B 7/086; G01S 3/48
See application file for complete search history.

(56) References Cited

U.S. PATENT DOCUMENTS

| | | | | |
|---|---|---|---|---|
| 6,052,084 A | * | 4/2000 | Aoshima | H01Q 1/3275 342/358 |
| 6,771,720 B1 | * | 8/2004 | Yang | H03G 3/3068 375/345 |

(Continued)

FOREIGN PATENT DOCUMENTS

WO    WO-2014190074 A1    11/2014

OTHER PUBLICATIONS

Partial International Search Report—PCT/EP2016/075510—ISA/EPO—dated Dec. 22, 2016.

(Continued)

*Primary Examiner* — Mehmood B. Khan
(74) *Attorney, Agent, or Firm* — Paradice and Li LLP/Qualcomm

(57) ABSTRACT

An apparatus includes an antenna array including at least a first antenna element and a second antenna element separated by a first distance. The apparatus receives a wireless advertising message, having a known bit pattern, via the first and second antenna elements. The apparatus samples a first portion of the known bit pattern from the wireless advertising message received via the first antenna element, and samples a second portion of the known bit pattern from the wireless advertising message received via the second antenna element, and determines a phase difference between the received wireless advertising message at each of the first and second antenna elements by correlating the first sampled portion and the second sampled portion to the known bit pattern. The apparatus then determines an angle of arrival (AoA) of the wireless advertising message based at least in part on the phase difference and the first difference.

20 Claims, 9 Drawing Sheets

(56) References Cited

U.S. PATENT DOCUMENTS

| | | | |
|---|---|---|---|
| 6,791,493 B1* | 9/2004 | Rose | G01S 3/46 342/156 |
| 6,907,270 B1* | 6/2005 | Blanz | H04B 7/10 342/124 |
| 2002/0044614 A1* | 4/2002 | Molnar | H04B 1/0003 375/346 |
| 2003/0103004 A1* | 6/2003 | Arndt | G01S 3/46 342/465 |
| 2003/0129996 A1* | 7/2003 | Maloney | G01S 5/12 455/456.1 |
| 2004/0102196 A1* | 5/2004 | Weckstrom | H04W 64/00 455/456.1 |
| 2005/0117676 A1* | 6/2005 | Liu | H04L 1/20 375/346 |
| 2007/0054623 A1* | 3/2007 | Sato | H04B 7/0617 455/67.11 |
| 2007/0287385 A1* | 12/2007 | Stephenne | H04B 7/08 455/67.11 |
| 2009/0213922 A1* | 8/2009 | Dent | H04B 1/7105 375/233 |
| 2010/0033378 A1* | 2/2010 | Straatveit | G01S 3/46 342/378 |
| 2010/0109903 A1* | 5/2010 | Carrick | G01S 5/14 340/8.1 |
| 2011/0299570 A1* | 12/2011 | Reed | H04B 7/0434 375/130 |
| 2012/0178471 A1 | 7/2012 | Kainulainen et al. | |
| 2012/0258669 A1* | 10/2012 | Honkanen | G01S 3/46 455/67.11 |
| 2013/0030931 A1* | 1/2013 | Moshfeghi | G01S 19/48 705/16 |
| 2013/0088395 A1* | 4/2013 | Vaarakangas | G01S 3/48 342/378 |
| 2013/0195229 A1* | 8/2013 | Cheng | H04L 27/0014 375/343 |
| 2014/0287692 A1* | 9/2014 | Gunnarsson | H04B 17/0057 455/67.11 |
| 2015/0054687 A1* | 2/2015 | Reed | H04B 17/0085 342/361 |
| 2016/0268678 A1* | 9/2016 | Agardh | H01Q 3/24 |
| 2017/0029107 A1* | 2/2017 | Emami | B64C 39/024 |

OTHER PUBLICATIONS

International Search Report and Written Opinion—PCT/EP2016/075510—ISA/EPO—dated Apr. 3, 2017.

* cited by examiner

DIRECTION FINDING FOR LEGACY BLUETOOTH DEVICES

BACKGROUND

Bluetooth is an evolving industry standard for personal area network (PAN) wireless communication. More specifically, Bluetooth® is a short range wireless technology that replaces wiring such as parallel printer cords and USB cables between devices.

Bluetooth exchanges data over short distances using short wavelength radio waves (e.g., 2.4 to 2.485 GHz) from fixed and mobile devices. The Bluetooth Special Interest Group (SIG) has recently proposed two mechanisms for direction finding in the Bluetooth 5.0 standard, one using angle of arrival (AoA) and the other using angle of departure (AoD).

In particular, Bluetooth 5.0 includes a new packet format with a 160 bit supplemental extension to enable a Bluetooth 5.0 device tracker to locate another Bluetooth 5.0 device asset. The new packet format uses new Bluetooth 5.0 hardware at both the transmitter and receiver devices. Consequently, problems may arise when devices based on the Bluetooth 5.0 standard attempt to locate legacy Bluetooth devices that use earlier Bluetooth standards, which lack Bluetooth 5.0 hardware, such as Bluetooth 4.0. In addition, aspects of the new Bluetooth 5.0 hardware infrastructure (e.g., multiple antennas) can be expensive.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and described below.

Figure 1:
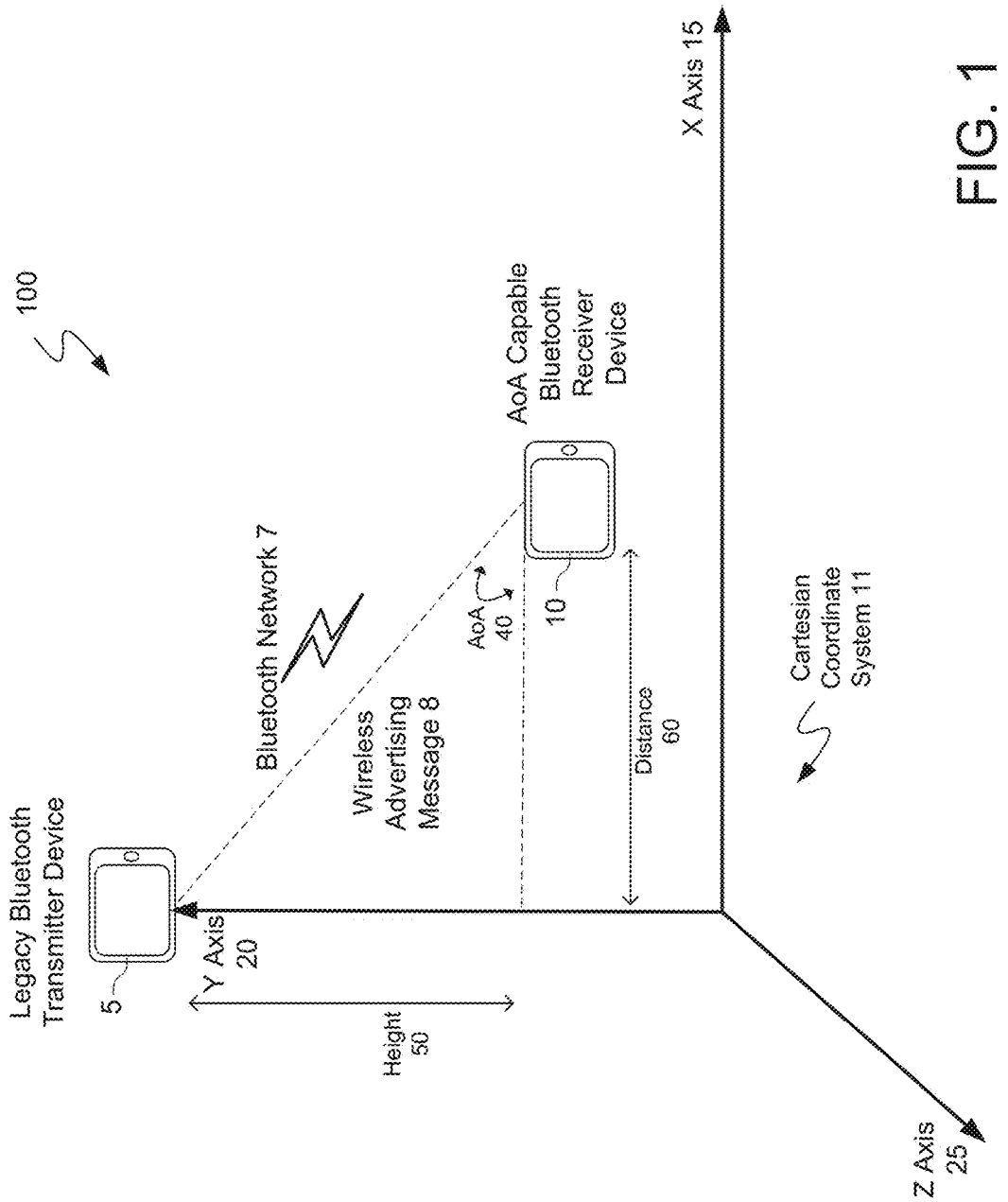
FIG. 1 illustrates the geometry of a direction finding system involving a legacy Bluetooth transmitter and an AoA capable Bluetooth receiver.

FIG. 1 illustrates a geometry of a direction finding system 100 involving a legacy Bluetooth transmitter device 5 and an AoA capable Bluetooth receiver device 10. Generally speaking, the AoA refers to the incident direction of an RF signal. The illustrated system 100 includes a short range wireless Bluetooth network 7, which is typically designed for low-power consumption based on low-cost transceiver chips. Because the legacy Bluetooth transmitter device 5 and an AoA capable Bluetooth receiver device 10 communicate using radio broadcast signals, the devices 5 and 10 need not be in each other's visual line of sight; however, a quasi-optical wireless path is available.

Bluetooth network 7 is a packet-based protocol with a master-slave structure that uses frequency-hopping spread spectrum radio technology. In the example, Bluetooth network 7 exchanges wireless packets, including wireless advertising packet(s) 8, between a legacy Bluetooth transmitter device 5 and an AoA capable Bluetooth receiver device 10 in accordance with Bluetooth protocol(s). The Bluetooth network 7 allows wireless packets to be exchanged between Bluetooth transmitter device 5 and AoA capable Bluetooth receiver device 10, which can operate using a variety of Bluetooth specification standards.

A short range transmitter device or a legacy short range device, such as the illustrated legacy Bluetooth transmitter device 5, includes hardware and software (which are described below with reference to FIGS. 2 and 3) and operates in accordance with the Bluetooth 4.0 protocol. Bluetooth 4.0 supports Bluetooth Classic (e.g., Bluetooth 1.0, 1.1, 1.2, 2.0, 2.1, 3.0) and Bluetooth Smart/Low Energy (BLE) (e.g., Bluetooth 4.0, 4.1, 4.2) specifications. In this example, a mobile device or a short range tracker device, such as AoA capable Bluetooth receiver device 10, includes hardware and software (described below with reference to FIGS. 2 and 3) and operates in accordance with the Bluetooth 5.0 protocol.

Legacy Bluetooth transmitter device 5 transmit signals including advertising messages having advertising packets that are received by the AoA capable Bluetooth receiver device 10, for instance, BLE receivers. The advertising packets include information identifying the legacy device. The legacy Bluetooth transmitter device 5 is mapped to a Cartesian coordinate system 11 defined by an x axis 15, y axis 20, and z axis 25. Legacy Bluetooth transmitter device 5 is oriented at a zero position on both the x axis 15 and z axis 25, but on the y axis 20 has a bearing relative to AoA capable Bluetooth receiver device 10 of height 50. In other words, legacy Bluetooth transmitter device 5 is oriented above (i.e., vertical to) AoA capable Bluetooth receiver device 10.

Along the Cartesian coordinate system 11, AoA capable Bluetooth receiver device 10 is oriented at a zero position on the z axis 25, but on the x axis 15 has a bearing relative to legacy Bluetooth transmitter device 5 of distance 60. Hence, legacy Bluetooth transmitter device 5 is spaced apart (i.e., horizontally) from AoA capable Bluetooth receiver device 10.

Collectively, the height 50, distance 60, and the orientations of the legacy Bluetooth transmitter device 5 on Cartesian coordinate system 11 define a particular AoA 40. The AoA is the angle at which the electromagnetic radiation (e.g., RF signal) arrives at the receiving antenna of the AoA capable Bluetooth receiver device 10. The AoA is measured based on a reference plane, such as the horizon or, in this example, the plane formed by the y axis 20 and the z axis 25.

AoA estimation may be used in wireless sensing and communications applications, for example, RF source localization. AoA measurement can be performed using an antenna array (shown in FIG. 2), in which the phase difference between the received signals at each antenna array element is mapped to determine the incident direction of the signal. Since the phase of the received signal is usually more stable than the received signal strength indication (RSSI), AoA estimation can achieve higher accuracy than approaches that are RSSI-based. Two or more antenna elements in the antenna array are sufficient to achieve accurate target localization with AoA measurement.

Legacy Bluetooth transmitter device 5 and AoA capable Bluetooth receiver device 10 can be beacon transmitters, personal computers (PCs), laptops, personal digital assistants (PDAs), smartphones, tablet computers, wearables, fitness watches, smartwatches, hands-free headsets, speakers, mice, keyboards, printers, GPS receivers, set top boxes, cameras, portable games or media players with wireless communication elements, or other portable devices designed to communicate via one or more wireless networks, including packet-switched transport networks. Legacy Bluetooth transmitter device 5 and AoA capable Bluetooth receiver device 10, however, are in communication via Bluetooth network 7 and may have the capability to communicate via other wired or wireless media, such as a WiFi connection (now shown). Legacy Bluetooth transmitter device 5 and AoA capable Bluetooth receiver device 10 may have network communication capability and one or more physical elements for providing a user interface. Internally, such devices/systems typically include one or more wireless transceivers or other network interface device for data communication, a processor configured/connected to control device operation, a memory and programming.

In the example, legacy Bluetooth transmitter device 5 and AoA capable Bluetooth receiver device 10 are shown as touch screen type mobile devices which have a touch screen display for displaying content and receiving user input as (or as part of) the user interface. However, the structure and operation of the touch screen type devices 5 and 10 is provided by way of example; and the subject technology as described herein is not intended to be limited thereto.

Figure 2:
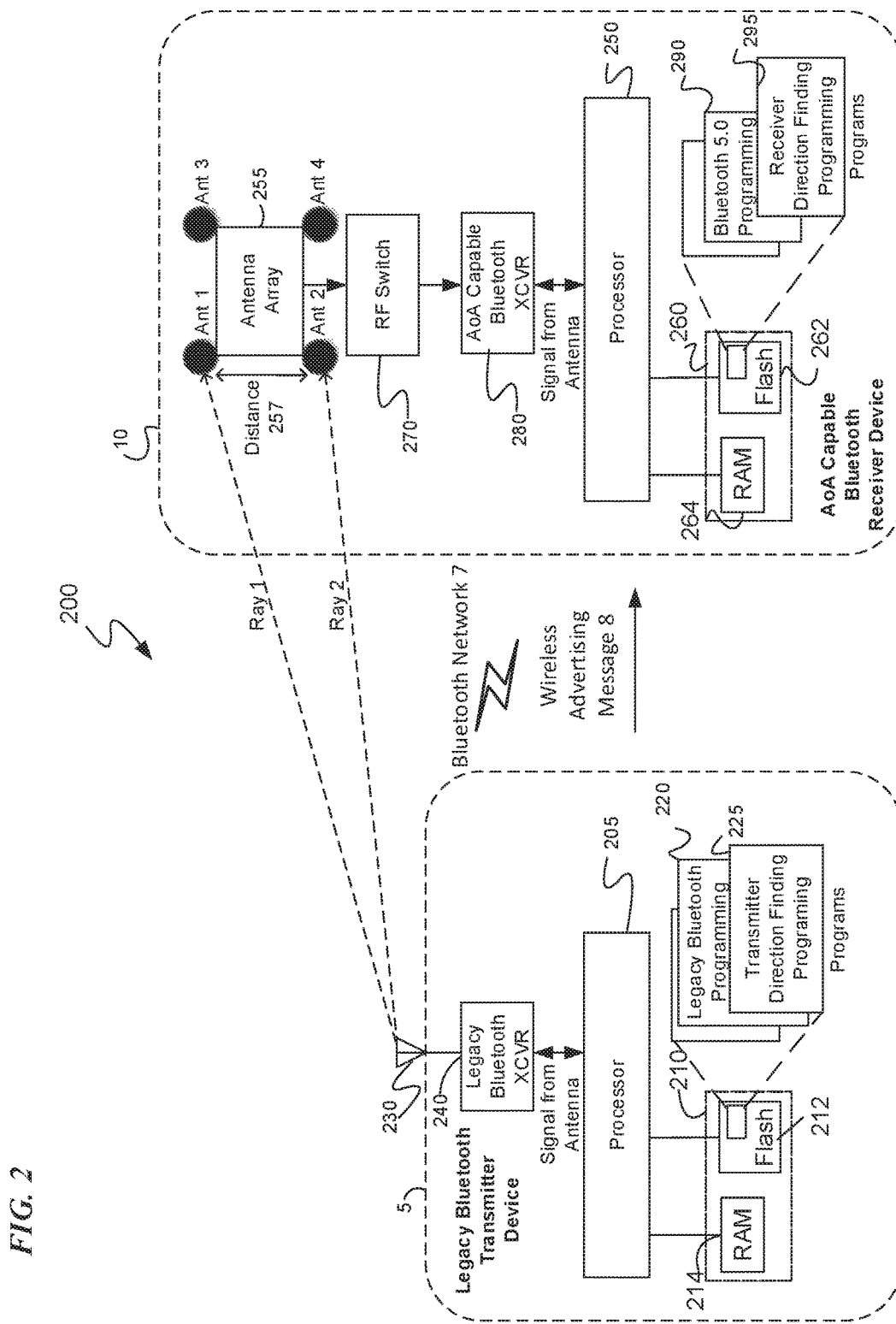
FIG. 2 is a high-level functional block diagram of an example system of networks and devices that provide a variety of communication services, including communications in support of the proposed direction finding, such as determining AoA.

FIG. 2 is a high-level functional block diagram of an example of a system 200 of networks and devices that provide a variety of communication services, including communications in support of the proposed direction finding, such as determining AoA. The legacy Bluetooth transmitter device 5 and AoA capable Bluetooth receiver device 10 are in communication over Bluetooth network 7, which transmits messages between devices 5 and 10, including one or more Bluetooth wireless advertising packet(s) 8.

Legacy Bluetooth transmitter device 5 includes processor 205, memory 210 storing legacy Bluetooth programming 220 and transmitter direction finding programming 225, antenna 230 (or antenna array), and legacy Bluetooth transceiver (XCVR) 240. AoA capable Bluetooth receiver device 10 includes processor 250, antenna array 255, memory 260 storing Bluetooth 5.0 programming 290 and receiver direction finding programming 295, RF switch 270, and AoA capable Bluetooth transceiver (XCVR) 280.

AoA capable Bluetooth receiver device 10 may include additional digital or analog transceivers (not shown), and the transceivers may be coupled to the antenna array 255 via the RF switch 270. In one example, the AoA capable Bluetooth XCVR 280 sends and receives a variety of Bluetooth signaling messages in support of AoA measurement provided by the AoA capable Bluetooth device 10 to the legacy Bluetooth device 5 via Bluetooth network 7. Both AoA capable Bluetooth XCVR 280 and legacy Bluetooth XCVR 240 can connect through radio frequency (RF) send-and-receive amplifiers (not shown) to respective antenna 230 or antenna array 255 via an RF switch 270.

Devices 5 and 10 can be powered by a battery or a fixed power source, such as a USB adapter. When legacy Bluetooth XCVR 240 is proximate to AoA capable Bluetooth XCVR 280, the devices 5 and 10 may attempt to connect to each other through the use of wireless advertising messages 8.

RF switch 270 selects an antenna for transmission or reception and prevents multiple RF radio transceivers from simultaneously trying to transmit, and/or receivers from receiving signals via the antenna array 255 of the AoA capable Bluetooth transceiver device 10. For example, in addition to AoA capable Bluetooth receiver XCVR 280, AoA capable Bluetooth receiver device 10 can include one or more cellular network radios, a GPS positioning radio, a Wi-Fi interface, and an FM radio. RF switch 270 is used to avoid the use of multiple RF circuitry associated with these multiple antennas. In our example, RF switch 270 switches between the elements (ant 1, ant 2, ant 3, and ant 4) of antenna array 255 which, in this example, is a linear model (e.g., line of sight array with four evenly spaced antenna elements not shown), although any suitable number of antenna elements, various distances, and configurations, such as a square antenna array that has a three-dimensional angle with elevation may be used.

RF switch 270 can be implemented with mechanical structures, including subminiature relays, as well as micro-electromechanical switches, gallium-arsenide, CMOS FET switches, PIN diodes, or other suitable switching arrangements. Generally, RF switch 270 is specified by pass frequency, voltage standing wave ratio (VSWR), isolation, insertion loss, return loss, power handling, and switching speed. A mechanical RF switch 270 offers high power handling, low insertion loss, and good isolation characteristics, but relatively slow switching speed, and may fail due to mechanical fatigue.

When communicating over the Bluetooth network 7, the Bluetooth transmitter device 5 and Bluetooth receiver device 10 synchronize their clocks. In the example, AoA capable Bluetooth receiver device 10 serves as the master device and the legacy Bluetooth transmitter device 5 serves a slave device. A packet exchange between the legacy Bluetooth transmitter device 5 and the AoA capable Bluetooth receiver device 10 and takes place using the clock set by the AoA capable Bluetooth receiver device 10. When Bluetooth network 7 operates in Bluetooth Classic mode, this clock has a period of 312.5 µs, making a single slot of 625 µs with a slot pair of 1250 µs. As a master device, the AoA capable Bluetooth receiver device 10 transmits packets in even slots and receives in odd slots. As a slave device, Bluetooth transmitter device 5 receives packets in even slots and transmits in odd slots.

Devices, such as legacy Bluetooth transmitter device 5 and AoA capable Bluetooth receiver device 10, that operate in a Bluetooth network 7 divide their transmitted data into packets. In Bluetooth Classic mode, each packet is transmitted over Bluetooth network 7 on one of 79 designated Bluetooth channels between 2402 MHz up to 2480 MHz in 1 MHz steps.

When the Bluetooth network 7 operates in accordance with Bluetooth Smart/Low Energy (BLE) technology (e.g., Bluetooth 4.0), dual-mode devices can share a single radio antenna, and a direct-sequence spread spectrum is employed. BLE uses a modulation scheme with 2 MHz spacing, which has 40 2-MHz channels and can perform 1,600 hops per second to accommodate adaptive frequency-hopping. Within each channel, BLE devices transmit using Gaussian frequency shift modulation, similar to Bluetooth Classic's basic rate scheme of 1 Mbit/s, and the maximum transmit power is 10 mW.

To find the direction (e.g., AoA) of a Bluetooth device asset, such as legacy Bluetooth transmitter device 5, a tracker/locator, such as AoA capable Bluetooth receiver device 10, receives wireless advertising message(s) 8 from the legacy Bluetooth transmitter device 5. Transmitter direction finding programming 290 of the legacy Bluetooth transmitter device 5 sends wireless advertising messages(s) 8 having a packet format with a preamble which is a known eight bit sequence of ones and zeros; and a 32 bit advertising access address that is known to be 0x8E89BED6. AoA capable Bluetooth receiver device 10 receives and decodes wireless advertising message(s) 8 and uses the known preamble and the fixed access address to do timing and frequency offset measurements when receiving wireless advertising message(s) 8 via antenna array 255.

The first part of the wireless advertising message(s) 8 (i.e., preamble and part of the access address or just preamble) transmitted by legacy Bluetooth transmitter device 5 trains AoA capable Bluetooth receiver device 10. The second part of the wireless advertising message(s) 8 is a sync word that is sampled when the elements (ant 1, ant 2, ant 3, ant 4) of antenna array 255 are switched. The samples of the sync word are used to measure the phase difference in arrival of the wireless advertising message(s) 8 on the antenna elements. When AoA capable Bluetooth receiver device 10 is in scan mode, it searches for the fixed preamble and advertising access address identifiers and then detects AoA. Hence, the preamble alone or the preamble along with part of the access address field of the wireless advertising packet can be used for direction finding, such as AoA. Also included in wireless advertising message 8 is a payload (PDU) field which is 152 bits and a cyclic-redundancy check (CRC) field which is 24 bits. Because the payload may change during reception of the wireless advertising message 8 and the payload is lightened, the payload may be an unknown sequence (i.e., scrambling and pseudorandom bits occur in the payload). Because the preamble and access address fields are known, these fields are used for direction finding.

In this example, a sync word is 32 bits and each bit is sampled in a 1 µs predetermined time period. The sample slot is a predetermined time period set to 1 µs per antenna element. In addition, the example RF switch 270 takes 1 µs to switch between the elements (ant 1, ant 2, ant 3 and ant 4) of antenna array 255, so the switch slot time is a predetermined time period set to 1 µs per antenna element of antenna array 255. Because antenna array 255 has four antenna elements, the RF switch 270 connects to ant 1 during switch slot 1 and samples from ant 1 during sample slot 1; then the RF switch 270 moves to antenna 2 during switch slot 2 and samples from ant 2 during sample slot 2. RF switch 270 subsequently moves to ant 3 during switch slot 3, and samples from ant 3 during sample slot 3; then RF switch 270 connects to ant 4 during switch slot 4 and samples from ant 4 during sample slot 4; etc. (depending on the number of elements in antenna array 270). This switching and sampling repeats until the bits in the sync word are sampled, but note that in this instance only half of the bits in the sync word are sampled due to the switch slot time. In addition, the switching and sampling may also complete when the legacy Bluetooth transmitter device 5 has finished transmitting the adverting message, or other suitable time.

The received bits of the sync word are then correlated with the bits of the known advertising access address to determine the respective phases of the signals received by the antenna elements ant 1 through ant 4.

As the advertising access address is fixed, the AoA capable Bluetooth receiver device 10 knows the reference signal it should be receiving. Switching of the antenna array 255 occurs in 1 µs and sample data is captured for 1 µs for each element of the antenna array 255. While the wireless advertising message(s) 8 is not decoded correctly at the receiver as only portions of the access address are received, the bearing of the legacy Bluetooth transmitter device 5, can be computed based on the received phase difference in arrival of the samples on the elements of the antenna array 255. To compensate for the corruption of the wireless advertising message 8 by the antenna switching, AoA capable Bluetooth receiver device 10 substitutes the known advertising address into the received message before sending the advertising message to the rest of the components of device 10 for further processing.

The bearing or compass direction, such as AoA, of legacy Bluetooth transmitter device 5 and AoA capable Bluetooth receiver device 10 is then computed. Generally, the AoA measurement involves determining the direction of propagation of a radio-frequency wave incident on an antenna array 255. This bearing of the legacy Bluetooth transmitter device 5 and AoA capable Bluetooth receiver device 10, is measured by determining the time difference of arrival (TDOA) at individual elements (ant 1, ant 2, ant 3, ant 4, . . . ant n) of the antenna array 255 using wireless advertising message(s) 8.

From these delays the AoA can be calculated, for example, the phase difference between the received signals at each antenna array element may be mapped to the incident direction of the signal. The elements of antenna array 255 are spaced apart by an antenna separation distance 257. In particular, the AoA is a function of the measured phase difference and antenna separation distance 257. Various probability density functions can be used for the mapping, including a Gaussian or "normal" distribution, hyperbolic distribution, normal distribution, or other suitable distribution that map various phase differences and antenna separation distance(s) 257 to a particular AoA to find a direction of maximum intensity of the RF signal. The functions convert modulated RF data, such as from the last eight or sixteen bits in the access address portion ("switch/sample portion") into an actual received waveform in order to determine AoA by comparing an expected waveform with the actual received waveform. In some examples, radio signal strength indication (RSSI) and triangulation based approaches can also be used to determine location.

The illustration shows the ideal scenario of rays (ray 1 and ray 2) from the antenna 230 of legacy Bluetooth transmitter device 5. Note that the line/length of ray 1 from 230 to ant 1 of antenna array 255 is longer than the line/length of ray 2 from antenna 230 to ant 2 of antenna array 255. This difference in distance (e.g., ray lengths) results in a difference in phase of the received signal, and this phase difference can be translated into an AoA using simple geometric techniques.

A Bluetooth mobile device, such as legacy Bluetooth transmitter device 5, transmits advertising messages at regular intervals (e.g., 100 milliseconds) and a tracker/locator device, such as AoA capable Bluetooth receiver device 10, receives the messages using an antenna array 255 that is switched by RF switch 270. During AoA calculation, AoA capable Bluetooth receiver device 10 calculates its own compass position with respect to the legacy Bluetooth transmitter device 5 using TDOA. By finding the respective delays of the known signal provided by the legacy Bluetooth transmitter device 5 at each antenna, the AoA capable Bluetooth receiver device 10 can estimate the AoA of the legacy Bluetooth transmitter device 5.

As shown, each of the legacy Bluetooth transmitter device 5 and the AoA capable Bluetooth receiver device 10 includes a respective processor 205, 250 in the form of one or more CPUs or microprocessors, sometimes referred to herein as the host controller, for executing program instructions. Each processor 205, 250 is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processors 205, 250, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in devices 5 and 10, other devices and computers, network elements, etc.

Legacy Bluetooth transmitter device 5 and AoA capable Bluetooth receiver device 10 also include a memory system 210, 260. In the example, the memory system 210, 260 may include a flash memory 212, 262 and a random access memory (RAM) 214, 264, or other suitable storage media/device, that is accessible to the processor to execute various programming instructions. The RAM 214, 264 serves as short term storage for instructions and data being handled by the processor 602, e.g. as a working data processing memory. The flash memory 212, 262 typically provides longer term storage.

The memories 210, 260 typically store data and programming, such that execution of the programming by the processors 205, 250 configures legacy Bluetooth transmitter device 5 and AoA capable Bluetooth receiver device 10 to perform the functions or procedures in support of direction finding, including determining AoA.

For purposes of the present discussion, the flash memories 212, 262 store programming or applications for execution by the processors 205, 250, typically through operation/execution of the device operating system, which configures processors 205, 250 of devices 5 and 10 to perform various functions when executing instructions of the programming. Hence, in the examples of legacy Bluetooth transmitter device 5 and AoA capable Bluetooth receiver device 10, the flash memory 212, 262 is used to store programming or instructions for execution by the processors 205, 250. In the illustration, legacy Bluetooth transmitter device 5 includes programming stored in memory 212, and more specifically, legacy Bluetooth programming 220 and transmitter direction finding programming 225.

The legacy Bluetooth programming 220 includes procedures for the legacy Bluetooth protocol, such as a packet-based protocol with a master-slave structure that uses frequency-hopping spread spectrum radio technology operating in accordance with the Bluetooth 4.0 specification. Execution of the transmitter direction finding programming 225 causes processor 205 of legacy Bluetooth transmitter device 5 to perform the functions described earlier, including formatting and transmitting a wireless advertising message 8 over the Bluetooth network 7 with a packet format that includes fields of a preamble, an access address, a payload, and a cyclic-redundancy check (CRC); as well as the other steps of FIG. 3.

AoA capable Bluetooth receiver device 10 includes programming stored in memory 262, and more specifically includes Bluetooth 5.0 programming 290 and receiver direction finding programming 295. The legacy Bluetooth 5.0 programming 290 includes procedures operating in accordance with the Bluetooth 5.0 protocol. Execution of receiver direction finding programming 290 causes processor 250 of AoA capable Bluetooth receiver device 10 to perform the functions described earlier, including receiving a wireless advertising message 8 over the Bluetooth network 7, training, sampling, antenna switching, and computing AoA; as well as the other steps of FIG. 3.

Returning more specifically to the mobile devices 5 and 10 of FIG. 2, the processors 205, 250 serve as a programmable host controller for devices 5 and 10 by configuring legacy Bluetooth transmitter device 5 and AoA capable Bluetooth receiver device 10 to perform various operations, for example, in accordance with instructions or programming executable by processors 205, 250. Such operations may include various general operations of the devices 5 and 10, as well as operations related to communications between devices 5 and 10. Although a processor may be configured by use of hardwired logic, typical processors in mobile devices are general processing circuits configured by execution of programming.

The legacy Bluetooth transmitter device 5 and AoA capable Bluetooth receiver device 10 may store and run a mobile operating system through which specific programming or applications, run on devices 5 and 10. Examples of mobile operating systems include Google Android, Apple iOS (I-Phone or iPad devices), Windows Mobile, Amazon Fire OS, RIM BlackBerry operating system, or the like. Flash memory 212, 262 may also be used to store mobile configuration settings for different mobile applications or services executable at devices 5 and 10 using processors 205, 250.

In general, the term "program" or "programming," as used herein, refers to logic embodied in software programming instructions/modules (e.g., subroutines, procedures, or functions) written in a programming language, such as Java™, C, C++, C Sharp, PHP, HyperText Markup Language ("HTML"), JavaScript, or Perl, for example. A software program can be compiled into executable programs or written in interpreted programming languages, such as Perl or Visual Basic script. Software programs may be callable from other modules. Generally, the programs described herein refer to logical modules that may be merged with other modules or divided into sub-modules despite their physical organization. The programming can be stored in any type of computer readable medium or computer storage device (e.g., non-transitory computer readable media) and be executed by one or more processors of general purpose computers. In addition, the methods and processes disclosed herein can alternatively be embodied in specialized computer hardware, a field-programmable gate array ("FPGA"), or an application specific integrated circuit ("ASIC").

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications for direction finding, such as determining AoA, on legacy Bluetooth transmitter device 5 and AoA capable Bluetooth receiver device 10. Program aspects of the technology may be thought of as "products" or "articles of manufacture" typically in the form of executable code or process instructions and/or associated data that is stored on or embodied in a type of machine or processor readable medium (e.g., transitory or non-transitory), such as one of the memories 212, 214 of memory system 210, one of the memories 262, 264 of memory system 260, or a memory of a computer used to download or otherwise install such programming into the devices 5 and 10, or a transportable storage device or a communications medium for carrying program for installation in the legacy Bluetooth transmitter device 5 and AoA capable Bluetooth receiver device 10.

The legacy Bluetooth transmitter device 5 and AoA capable Bluetooth receiver device 10 typically include an internal communication bus, program storage and data storage for various data files to be processed and/or communicated by the devices 5 and 10, although the devices 5,10 often receive programming and data via network communications. The hardware elements, operating systems and programming languages of such devices 5 and 10 are conventional in nature.

As shown in FIG. 2, legacy Bluetooth transmitter device 5 and AoA capable Bluetooth receiver device 10 each include at least one digital transceiver (XCVR) 240, 280, for digital wireless communications via Bluetooth network 7, although the devices 5 and 10 may include additional digital or analog transceivers (not shown). In particular, for the Bluetooth packet data communication, legacy Bluetooth transmitter device 5 and AoA capable Bluetooth receiver device 10 includes a data/network communication interface, shown as legacy Bluetooth XCVR 240 and AoA capable Bluetooth XCVR 280, respectively. The XCVRs 240, 280 may use any available Bluetooth data communication technology; however, in one example, legacy Bluetooth XCVR 240 each include a Bluetooth 4.0 hardware and software and AoA capable Bluetooth XCVR includes Bluetooth 5.0 hardware and software. The XCVRs 240, 280 allow the devices 5 and 10 to communicate with each other and other Bluetooth-equipped devices and systems.

The XCVRs 240, 280 (network communication interface) conform to one or more of the various digital wireless communication standards utilized by short range or modern mobile networks. Examples of XCVR 240 for legacy Bluetooth transmitter device 5 includes (but are not limited to) transceivers configured to operate in accordance with the Bluetooth 4.0 protocol, including both Bluetooth Classic (e.g., Bluetooth 1.0, 1.1, 1.2, 2.0, 2.1, 3.0) specifications and the Bluetooth Smart/Low Energy (BLE) (e.g., Bluetooth 4.0, 4.1, 4.2) network technologies, for example and without limitation. Examples of XCVR 280 for AoA capable Bluetooth receiver device 10 includes (but are not limited to) transceivers configured to operate in accordance with the Bluetooth 5.0 protocol, for example and without limitation. AoA capable Bluetooth receiver device 10 also supports earlier protocols.

XCVRs 240, 280 provide two-way wireless communication of information including digitized signals, including audio, still image and/or video signals, web page information for display as well as web related inputs, and various types of mobile message communications to/from the mobile devices 5 and 10. Several of these types of communications through the XCVRs 240, 280 and Bluetooth network 7, as described previously, relate to protocols and procedures in support of direction finding, including determining AoA. Such communications, for example, use packet data transport utilizing the digital wireless XCVRs 240, 280 and over the air communications to and from legacy Bluetooth transmitter device 5 and AoA capable Bluetooth receiver device 10.

Figure 3:
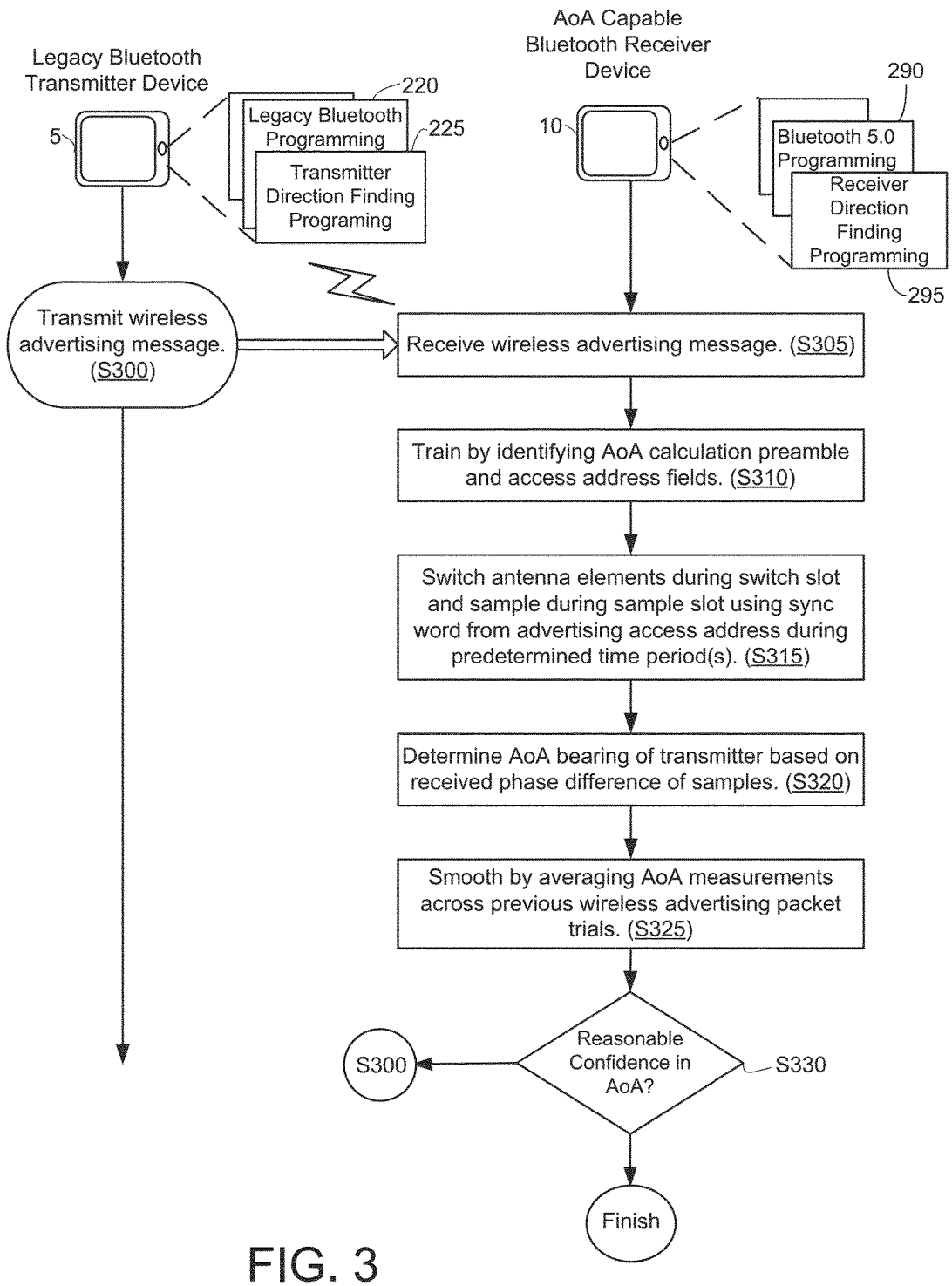
FIG. 3 is a flow chart of a procedure for determining AoA in the system involving a legacy Bluetooth transmitter and an AoA capable Bluetooth receiver.

FIG. 3 is a flow chart of a procedure for determining AoA in the system involving a legacy Bluetooth transmitter 5 and an AoA capable Bluetooth receiver 10. A program for locating legacy devices that is separate from or integrated into Bluetooth 5.0 may be used to execute the illustrated procedure. AoA capable Bluetooth receiver device 10 includes several components that are not shown, but described above, such as an antenna array having a plurality of antenna elements and the plurality of antenna elements are N in number and spaced apart from each other by an antenna distance. AoA capable Bluetooth receiver device 10 further includes a radio frequency (RF) switch coupled to the antenna elements; and a transceiver coupled to the RF switch and configured to receive wireless advertising messages over a short range network for processing from the legacy Bluetooth transmitter device 5. In addition, AoA capable Bluetooth receiver device 10 has a processor coupled to the transceiver; a memory accessible to the microprocessor; and programming in the memory, including Bluetooth 5.0 programming 290 and receiver direction finding programming 295 to support the steps outlined below. The legacy Bluetooth transmitter device 5 includes similar components, but the programming in the memory of legacy Bluetooth transmitter device 5, includes legacy Bluetooth programming 220 and transmitter direction finding programming 225.

Beginning in block S300, the legacy Bluetooth transmitter device 5 transmits a wireless adverting message over a short range network, such as Bluetooth.

Moving to S305, AoA capable Bluetooth receiver device 10 receives the wireless advertising message over the short range network from the legacy Bluetooth transmitter device 5. The wireless advertising message can have a known packet format with preamble, access address, payload, and CRC fields, including a known bit pattern.

Continuing to S310, AoA capable Bluetooth receiver device 10 identifies an initial wireless advertising packet.

Once the initial advertising packet has been received, the device 10 knows at least the approximate time at which the next packet will be received because, according to the standard, advertising packets are sent at fixed intervals (e.g. 100 ms).

In S315, when the next advertising packet is received, the device 10 adjusts its clock signal based on the preamble and, optionally, the first few bits of the advertising access address and the samples the remaining bits of the access address as a synch word. AoA capable Bluetooth receiver device 10 switches antenna elements during a switch slot and samples during multiple sample slots containing the sync word (advertising access address).

First, AoA capable Bluetooth receiver device 10 samples a first phase of an RF signal incident on a first antenna in the plurality of antenna elements in a switch/sample portion of the access address. The sample slot is set to a first predetermined time period. Second, AoA capable Bluetooth receiver device 10 switches, via the RF switch, between the first antenna to a second antenna in the plurality of antenna elements during a switch slot. The switch slot is set to a second predetermined time period. Third, after switching between the first antenna to the second antenna, AoA capable Bluetooth receiver device 10 samples, via the second antenna, a second phase of the RF signal incident on the second antenna during the sample slot set to the first predetermined time period (e.g., second received bit pattern portion). And fourth, AoA capable Bluetooth receiver device 10 measures phase difference in arrival between the sampled first phase of the RF signal on the first antenna and the sampled second phase of the RF signal on the second antenna by, for example, correlating the two samples (e.g., first received bit pattern portion to the known bit pattern and second received bit pattern portion to the known bit pattern of the advertising access address). AoA capable Bluetooth receiver device 10 may repeat these four steps for each of the N number of antenna elements in ascending order, thereby collecting N number of sampled RF signal phases. Each of the sampled RF signals correspond to a respective phase of the RF signal incident on a respective antenna element.

Continuing to S320, AoA capable Bluetooth receiver device 10 determines the AoA bearing with respect to the transmitter (legacy Bluetooth transmitter device 5) based on determined phase differences of the samples. In computing the measured phase difference and the respective antenna distance between the plurality of antenna elements, AoA capable Bluetooth receiver device 10 converts modulated RF data corresponding to the N number of sampled RF signal phases into an actual received waveform and compares the received waveform to an expected waveform. Next, AoA capable Bluetooth receiver device 10 computes the AoA of the RF signals from the legacy Bluetooth transmitter device 5 based on the measured phase difference and the antenna distance between the first antenna and the second antenna.

When computing the AoA, device 10 maps the N number of sampled RF signal phases to an incident direction of the RF signal from the legacy Bluetooth transmitter device 5 by computing the AoA as a function of the measured phase differences and the respective antenna distances among the plurality of antenna elements. The function of the measured phase difference and the respective antenna distance between the plurality of antenna elements may be, for example, a probability density function selected from one of a Gaussian or normal distribution, hyperbolic distribution, or other suitable distribution that maps the measured phase difference and the respective antenna separation distance to the AoA to find direction of maximum intensity of the RF signal. The mean of the probability density function may be an AoA calculated from the determined phase differences and the variance of the function may be determined according to a formula or look-up table based on the signal to noise ratio (SNR) of the received signal.

In S325, AoA capable Bluetooth receiver device 10 smoothes by averaging AoA functions across multiple wireless advertising packet trials. In particular, AoA capable Bluetooth receiver device 10 smoothes the computed AoA for each of the predetermined number of trials P by averaging the computed AoA for each previous wireless advertising packet. The combined functions result in a reduced variance that provides a measure of confidence of the combined AoA measurements. When the previously transmitted wireless advertising packet(s) did not result in reasonable confidence in the computed AoA, there are previous AoA measurements to average together, as described in step S330 below.

Finishing now in S330, AoA capable Bluetooth receiver device 10 checks whether there is a reasonable confidence in the computed AoA. If there is reasonable confidence in the computed AoA, the processing finishes and the AoA capable Bluetooth receiver device 10 transmits the computed or smoothed AoA to the legacy Bluetooth transmitter device 5. If there is not reasonable confidence in the computed AoA, S300 is returned to and the procedure of FIG. 3 is repeated.

Reasonable confidence in the computed AoA can also be established by having AoA capable Bluetooth receiver device 10 repeat steps S305, S310, S315, S320, and S325 for a predetermined time interval T. P number of separate wireless advertising packets P are received during the predetermined time interval T. For example, predetermined time interval T can be 0.5 seconds (s). AoA capable Bluetooth receiver device 10 smoothes the computed AoA for each of the P number of separate wireless advertising packets by averaging the computed AoA probability distribution function for each wireless advertising packet until the expected variance is less than a threshold value, for example, 20 degrees.

The P number of separate wireless advertising packets is predetermined and the predetermined time interval T is set to a length of time that is sufficient to receive the P number of separate wireless advertising packets. For example, the first predetermined time period of the sample slot is equal to the second predetermined time period of the switch slot. The first predetermined time period of the sample slot is a sufficient length of time to allow the RF switch to switch between the first antenna and the second antenna during transmission of a single bit in the switch/sample portion of the access address that follows the and the optional AoA calculation access address identifier.

The first predetermined time period of the sample slot and the second predetermined time period of the switch slot are sufficient lengths of time to allow the RF switch to switch between the first antenna and the second antenna such that every other bit in the sync portion of the access address is sampled in a sample slot. By way of example, the first predetermined time period of the sample slot is equal to the second predetermined time period of the switch slot, such as 0.5 to 5 µs.

Aspects of the methods of direction finding, including determining AoA, as outlined above may be embodied in programming, for example, for one or more mobile devices. Program aspects of the technology may be thought of as "products" or "articles of manufacture" typically in the form of executable code and/or associated data that is carried on or embodied in a type of machine readable medium. Executable code, for example, may take the form of software, firmware, microcode or the like of a type suitable for execution by the particular processor hardware of legacy Bluetooth transmitter device 5 and AoA capable Bluetooth receiver device 10 so as to configure the respective equipment to perform functions like those described herein.

Figure 4:
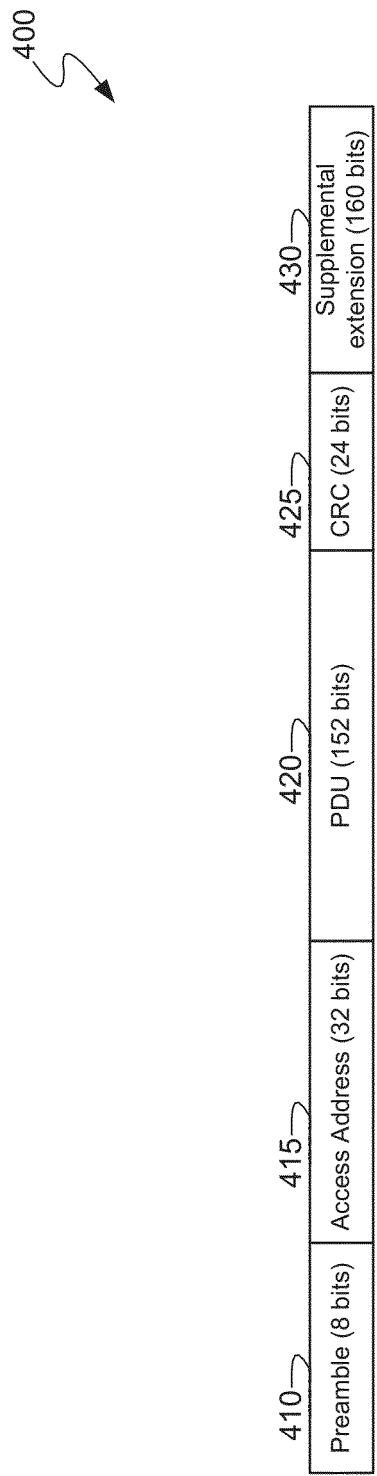
FIG. 4 is a data structure diagram of a Bluetooth 5.0 packet with a supplemental data extension to enable a Bluetooth 5.0 device tracker to locate another Bluetooth 5.0 device asset.

FIG. 4 is a Bluetooth 5.0 packet with a supplemental data extension to enable a Bluetooth 5.0 device tracker to locate another Bluetooth 5.0 device asset. As shown, the supplemental extension packet 400 includes an 8-bit preamble 410, 32-bit access address 415, 152-bit protocol data unit (PDU) or payload 420, 24-bit cyclic redundancy check (CRC) 425, and 160-bit supplemental data extension 430. Supplemental data extension 430 enables a Bluetooth 5.0 device tracker to locate another Bluetooth 5.0 device asset and perform direction finding, such as to determine AoA. According to Bluetooth 5.0, the Bluetooth 5.0 device asset (e.g., transmitter) is expected to transmit the supplemental extension packet 400 with the supplemental extension 430 and the Bluetooth 5.0 device tracker (e.g., receiver) is expected to receive and identify the supplemental extension packet 400. As a result, utilizing this supplemental extension packet 400 in Bluetooth 5.0 requires new hardware in both the Bluetooth 5.0 device asset and the Bluetooth 5.0 device tracker.

Figure 5A:
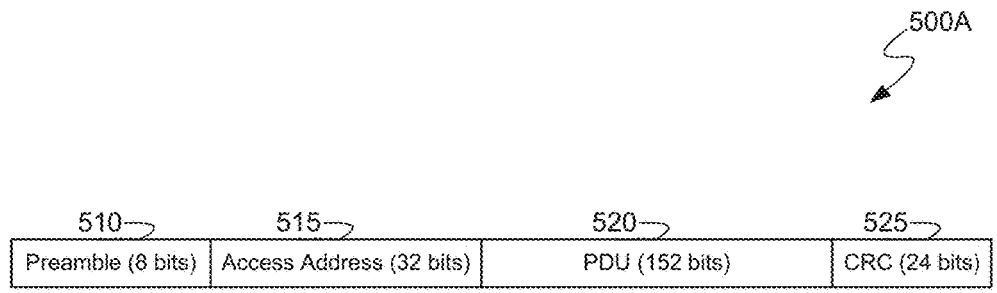
FIG. 5A is a data structure diagram of a legacy Bluetooth 4.0 advertising packet format.

FIG. 5A is a legacy Bluetooth 4.0 advertising packet format. As illustrated, the legacy advertising packet 500A includes an 8-bit preamble 510, 32-bit access address 515, 152-bit protocol data unit (PDU) or payload 520, and 24-bit cyclic redundancy check (CRC) 525. However, no supplemental data extension is included in the legacy advertising packet 500A for direction finding, including determining AoA.

Figure 5B:
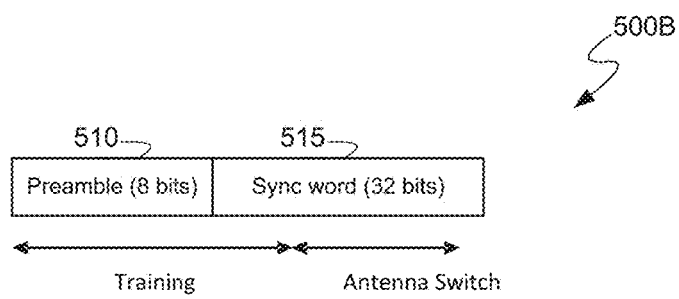
FIG. 5B is a data structure diagram that shows details of a proposed protocol for the legacy Bluetooth 4.0 advertising packet format of FIG. 5A for direction finding.

FIG. 5B is a drill down on a proposed protocol for the legacy Bluetooth 4.0 advertising packet format of FIG. 5A for direction finding, such as to determine AoA. Direction finding packet 500B includes an 8-bit preamble 510 and 32-bit access address 515. As illustrated, the preamble 510 and an optional portion of access address 515 comprise a first part of the direction finding packet 500B that is used for training the Bluetooth receiver device.

A second part of the direction finding packet 500B is then used to switch the antennas of the Bluetooth receiver device, sample the RF signal, and measure the phase difference in arrival of the direction finding packet 500B. This second part of the direction finding packet 500B is shown as a "sync word" and is also referred to as the "switch/sample portion." The bearing of the Bluetooth transmitter device is then computed based on the measured differences. Since the advertising access address is fixed, the Bluetooth receiver device knows the reference signal it should be receiving. In this example, the preamble 510 is a known or fixed sequence of one and zero bits. The advertising access address 515 is a fixed identifier, such as 0x8E89BED6.

Figure 5C:
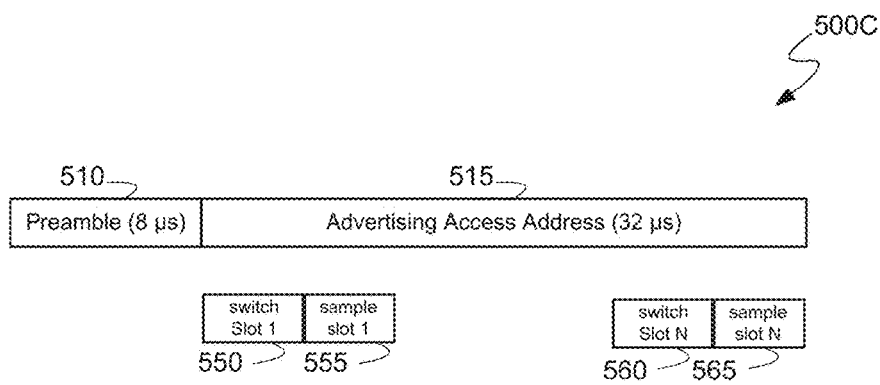
FIG. 5C is a data structure diagram of a proposed protocol for antenna switching and sampling for the legacy Bluetooth 4.0 advertising packet format of FIG. 5B for direction finding.

FIG. 5C is a proposed protocol for antenna switching and sampling for the legacy Bluetooth 4.0 advertising packet format of FIG. 5B for direction finding. The direction finding packet 500C includes an 8-bit preamble 510 and 32-bit access address 515. Preamble has 8-bits and is processed over an 8 μs time period and access address has 32-bits and is processed over a 32 μs time period. Antenna switching is done in 1 μs during each of the switch slots 550, 560 and the sample data is captured for 1 μs during each of the sample slots 555, 565, thus only portions of the access address may actually be received. While the direction finding packet 500C is not decoded correctly at the Bluetooth receiver device, the bearing of the Bluetooth transmitter device can be computed based on the received phase difference in arrival of the samples. To compensate for the corruption of the advertising message by the antenna switching, AoA capable Bluetooth receiver device 10 substitutes the known advertising address into the received message before sending the advertising message to the rest of the components of device 10 for further processing.

In accordance with this proposed protocol of FIGS. 5B and 5C, the bearing, such as AoA for legacy Bluetooth 4.0 devices is detected. Hence, the Bluetooth tracker device (Bluetooth receiver device) can be used to track legacy Bluetooth 4.0 devices, such that the Bluetooth 4.0 devices can be accurately located without any hardware update or modification. Only the software running on the device 10 is modified. Accordingly, the protocol of FIGS. 5B and 5C provides a direction finding system that: can be used to calculate the direction of Bluetooth 4.0 devices, requires no new hardware for the Bluetooth tag or asset being tracked, requires no new specification, improves performance of the system over an RSSI based system, leverages current single antenna deployments, and does not require Bluetooth 5.0 in all of the devices in the system.

FIGS. 6-9 described below show the sensitivity of the proposed protocol for direction finding with varying sync word lengths and number of trials. The performance analysis in the data plots of FIGS. 6-9 illustrate that as the number of snapshots (samples) considered for the sync word reduces from 32, 16, 8, 4, etc. and the number of trials goes down, the average error in computed AoA increases. Therefore the performance of the sensitivity of the proposed protocol for direction finding decreases as the number of samples and trials is reduced.

Figure 6:
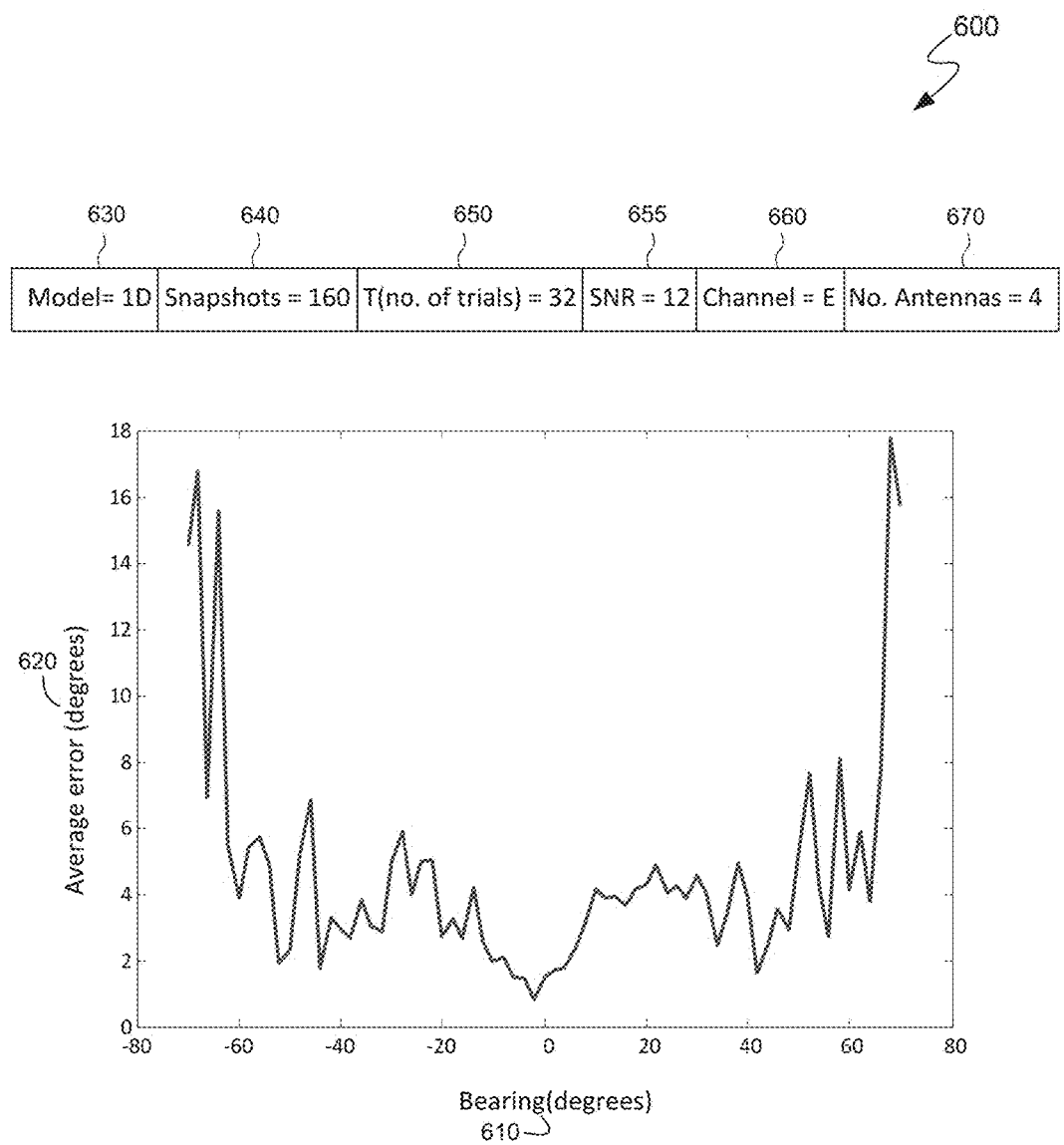
FIG. 6 is a performance data plot of a system that determines AoA for a receiver having a one-dimensional linear antenna with four evenly spaced antennas and using 16 bits of the advertising access address for antenna switching.

FIG. 6 is a data plot of the performance for determining the AoA for a receiver using 16 bits of the advertising access address for sampling, correlation and antenna switching. In the data plot 600, the computed AoA bearing 610 is provided in degrees on the x axis and the average error 620 in the computed AoA is provided in degrees on the y axis. The average error 620 is the difference in the computed AoA from the actual AoA (i.e., the correct AoA). Further, the data plot 600 is based on the following parameters: antenna model 630 is a one-dimensional antenna array (a linear antenna with evenly spaced antennas), number of snapshots 640 is 160, number of trials (T) 650 is 32, signal to noise ratio (SNR) 655 is 12 decibels (dB), channel model 660 is IEEE channel model E, and number of antennas 670 is 4.

Number of snapshots 640 corresponds to the portion size of the advertising access that is used for antenna switching and sampling. In this case, 16 bits of the advertising access address are used for antenna switching and 16 bits of the advertising access address are sampled. The 16 bits are sampled over 16 μs for 1 μs each. With these parameters, the computed AoA 610 in the data plot 600 achieves a maximum average error 620 that is less than 18 degrees and the average error 620 is highest at the more extreme levels of AoA (e.g., above ±60 to 70 degrees).

Figure 7:
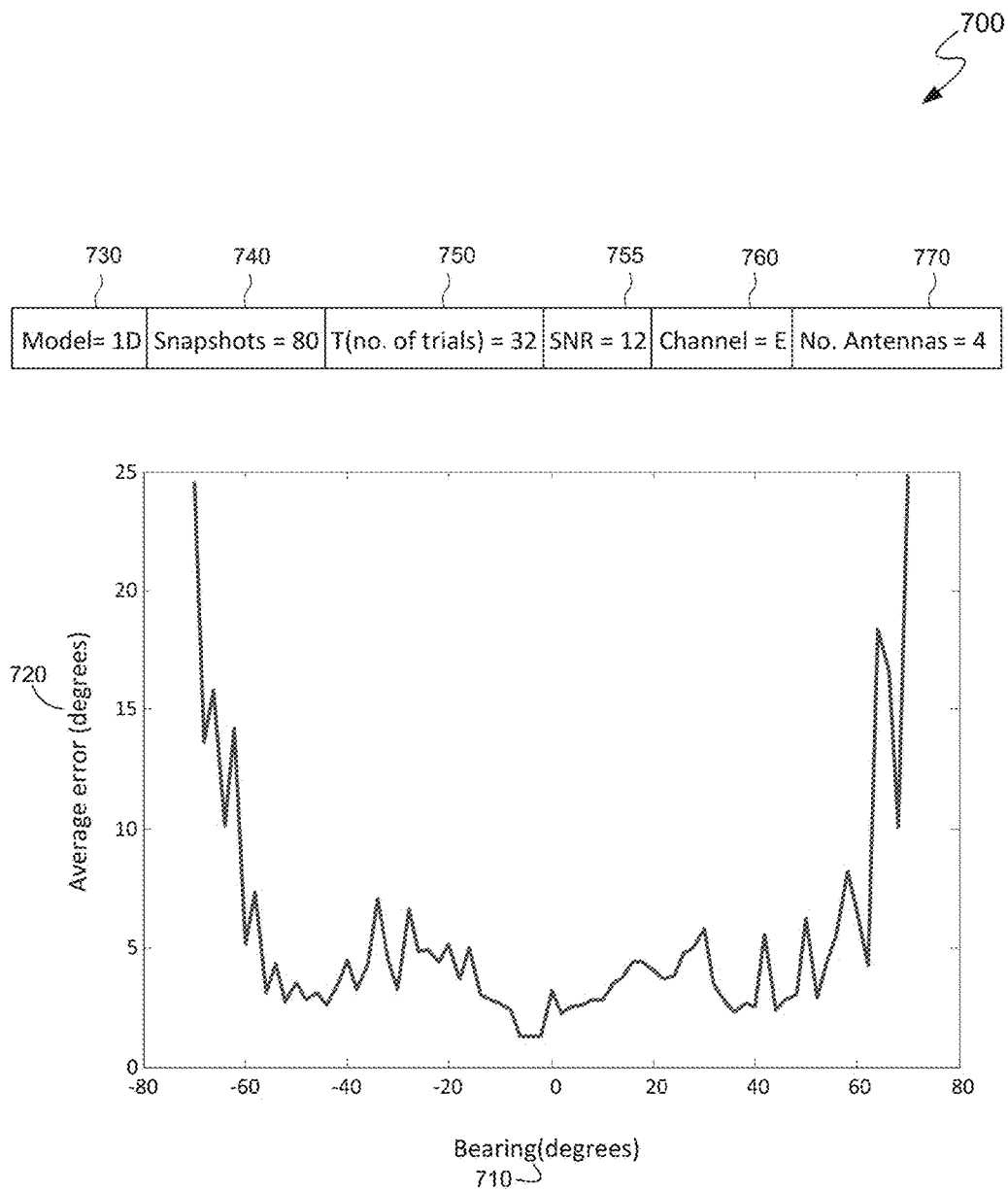
FIG. 7 is a performance data plot of a system that determines AoA for a receiver having a one-dimensional linear antenna with four evenly spaced antennas and using 8 bits of the advertising access address for antenna switching.

FIG. 7 is a data plot of the performance for determining AoA for a receiver having using 8 bits of the advertising access address for antenna switching. In the data plot 700, the computed AoA bearing 710 is provided in degrees on the x axis and the average error 720 in the computed AoA is provided in degrees on the y axis. The average error 720 is the difference in the computed AoA from the actual AoA (i.e., the correct AoA). Further, the data plot 700 is based on the following parameters: antenna model 730 is a one-dimensional antenna array (a linear antenna with evenly spaced antennas), number of snapshots 740 is 80, number of trials (T) 750 is 32, signal to noise ratio (SNR) 755 is 12 dB, channel model 760 is IEEE channel model E, and number of antennas 770 is 4.

In this case, 8 bits of the advertising access address are used for antenna switching and 8 bits of the advertising access address are sampled. The 8 bits are sampled over 8 μs for 1 μs each. With these parameters, the computed AoA 710 in data plot 700 achieves a maximum average error 720 that is less than 25 degrees and the average error 720 is highest at the more extreme levels of AoA (e.g., above ±60 to 70 degrees).

Figure 8:
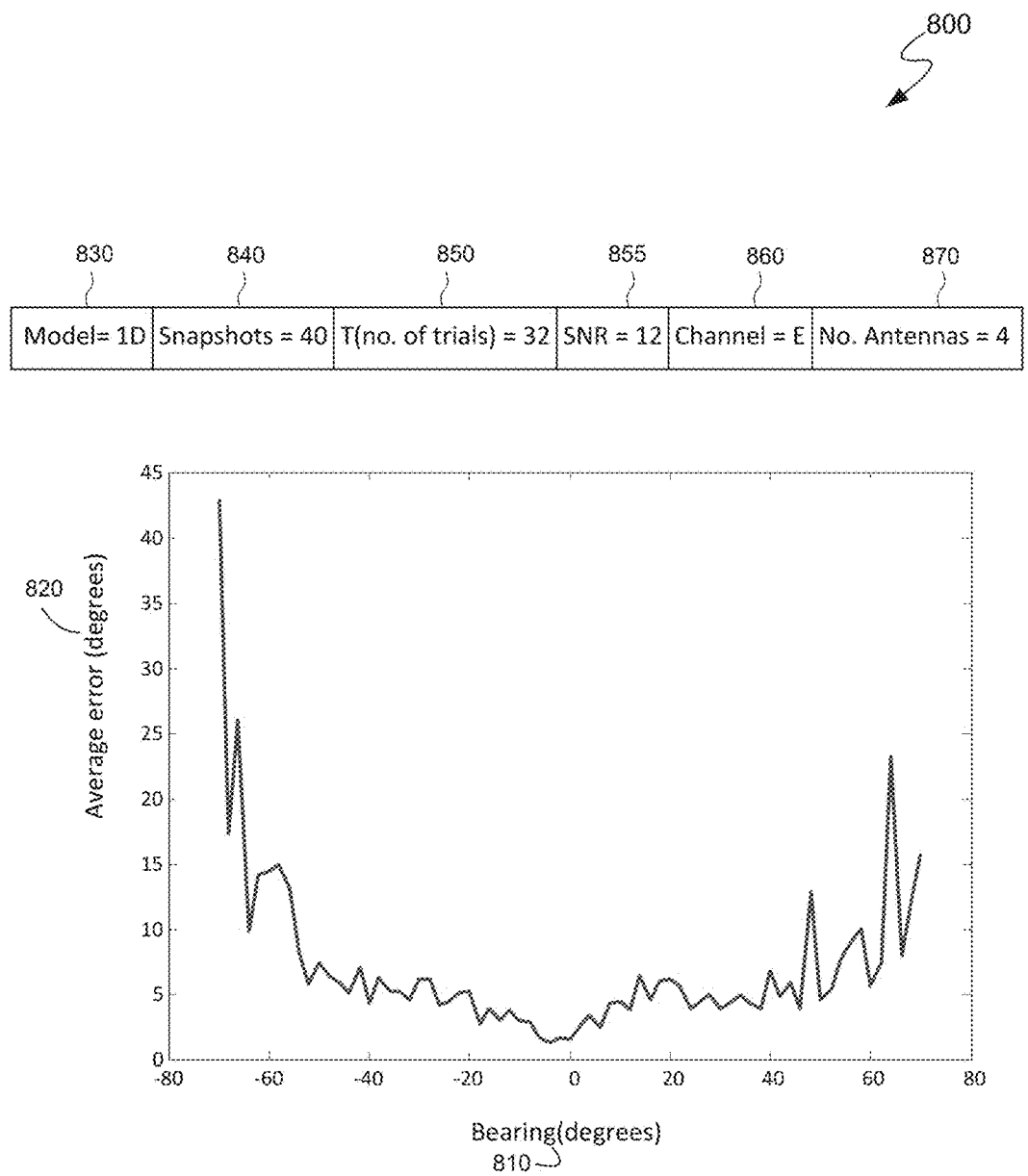
FIG. 8 is a performance data plot of a system that determines AoA for a receiver having a one-dimensional linear antenna with four evenly spaced antennas and using 4 bits of the advertising access address for antenna switching.

FIG. 8 is a data plot of the performance for determining AoA for a receiver using 4 bits of the advertising access address for antenna switching. In the data plot 800, the computed AoA bearing 810 is provided in degrees on the x axis and the average error 820 in the computed AoA is provided in degrees on the y axis. The average error 820 is the difference in the computed AoA from the actual AoA (i.e., the correct AoA). Further, the data plot 800 is based on the following parameters: antenna model 830 is a one-dimensional antenna array (a linear antenna with evenly spaced antennas), number of snapshots 840 is 40, number of trials (T) 850 is 32, signal to noise ratio (SNR) 855 is 12 dB, channel model 860 is IEEE channel model E, and number of antennas 870 is 4.

In this case, 4 bits of the advertising access address are used for antenna switching and 4 bits of the advertising access address are sampled. The 4 bits are sampled over 4 μs for 1 μs each. With these parameters, the computed AoA 810 in the data plot 800 achieves a maximum average error 820 that is less than 45 degrees and the average error 820 is highest at the more extreme levels of AoA (e.g., above ±60 to 70 degrees).

Figure 9:
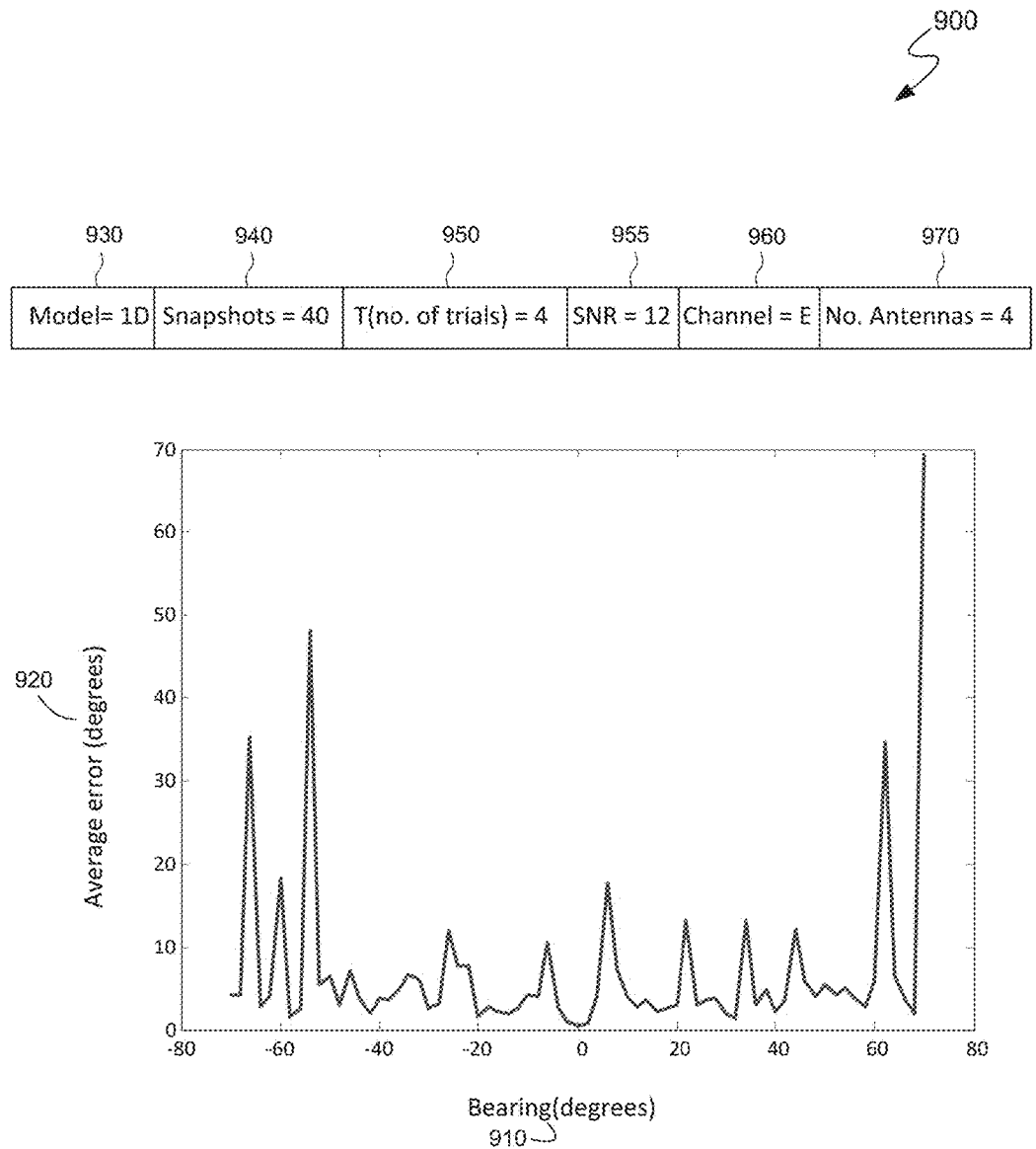
FIG. 9 is a performance data plot of a system that determines AoA for a receiver having a one-dimensional linear antenna with four evenly spaced antennas, using 4 bits of the advertising access address for antenna switching, and 4 packet averaging.

FIG. 9 is a data plot of the performance for determining AoA for a receiver using 4 μs of the advertising access address for antenna switching, and 4 packet averaging. In the data plot 900, the computed AoA bearing 910 is provided in degrees on the x axis and the average error 920 in the computed AoA is provided in degrees on the y axis. The average error 920 is the difference in the computed AoA from the actual AoA (i.e., the correct AoA). Further, the data plot 900 is based on the following parameters: antenna model 930 is a one-dimensional antenna array (a linear antenna with evenly spaced antennas), number of snapshots 940 is 40, number of trials (T) 950 is 32, signal to noise ratio (SNR) 955 is 12 dB, channel model 960 is IEEE channel model E, and number of antennas 970 is 4.

In this case, 4 bits of the advertising access address are used for antenna switching and 4 bits of the advertising access address are sampled. The 4 bits are sampled over 4 μs for 1 μs each and an average is taken from 4 different advertising packets. With these parameters, the computed AoA 910 in the data plot 900 achieves a maximum average error 820 that is less than 70 degrees and the average error 920 is highest at the more extreme levels of AoA (e.g., above ±60 to 70 degrees).

"Storage" type media include any or all of the tangible memory of the computers, mobile devices, processors or the like, or associated modules thereof, such as various semiconductor memories, tape drives, disk drives and the like, which may provide non-transitory storage at any time for the programming. All or portions of the programming may at times be communicated through the Internet or various other telecommunication networks. Such communications, for example, may enable loading of the software or modules from one computer or processor into another, for example, from a personal or host computer of the owner of legacy Bluetooth transmitter device 5 or AoA capable Bluetooth receiver device 10 to the devices 5 and 10; from a host or computer server of the enterprise or vendor that manufactures legacy Bluetooth transmitter device 5 or AoA capable Bluetooth receiver device 10 to the devices 5 and 10. These communications include downloading receiver direction finding programming 295 into AoA capable Bluetooth receiver device 10; or downloading transmitter direction finding programming 225 into legacy Bluetooth transmitter device 5. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s), mobile devices or the like, such as may be used to implement the secure payment processing techniques described herein. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
an antenna array including at least a first antenna element and a second antenna element separated by a first distance;
one or more processors; and
a memory storing instructions that, when executed by the one or more processors, cause the apparatus to:
receive a first number of bits of a Bluetooth wireless advertising message via the first antenna element;
receive a second number of bits of the Bluetooth wireless advertising message via the second antenna element, wherein data corresponding to the second number of bits is different than data corresponding to the first number of bits;
sample the first number of bits of the Bluetooth wireless advertising message received via the first antenna element to obtain a first sampled portion;
compare the first sampled portion to a corresponding first number of bits of a Bluetooth advertising access address;
sample the second number of bits of the Bluetooth wireless advertising message received via the second antenna element to obtain a second sampled portion;
compare the second sampled portion to a corresponding second number of bits of the Bluetooth advertising access address;
determine a phase difference between the first and second sampled portions based on the comparisons; and
determine an angle of arrival (AoA) of the Bluetooth wireless advertising message based at least in part on the phase difference and the first distance.

2. The apparatus of claim 1, wherein the antenna array includes a number (N) of antenna elements spaced apart by the first distance, and wherein execution of the instructions further causes the apparatus to:
receive the Bluetooth wireless advertising message via the N antenna elements;
determine a respective phase of the Bluetooth wireless advertising message received at each of the N antenna elements; and
determine the AoA of the Bluetooth wireless advertising message based at least in part on the respective phases and the first distance.

3. The apparatus of claim 2, wherein execution of the instructions to determine the AoA of the Bluetooth wireless advertising message causes the apparatus to:
map phase differences among the respective phases to an incident direction of the Bluetooth wireless advertising message.

4. The apparatus of claim 3, wherein the AoA is determined based on a probability density function including at least one of a Gaussian or normal distribution, a hyperbolic distribution, or another suitable distribution that maps the phase differences and the first distance to the AoA.

5. The apparatus of claim 2, wherein execution of the instructions to determine the respective phases of the Bluetooth wireless advertising message causes the apparatus to:
convert a portion of the received Bluetooth wireless advertising message from each of the N antenna elements to a corresponding received waveform; and
compare the received waveforms with an expected waveform to determine the respective phases of the received Bluetooth wireless advertising message at each of the N antenna elements.

6. The apparatus of claim 1, wherein execution of the instructions further causes the apparatus to:
determine an AoA for each of a predetermined number (P) of Bluetooth wireless adverting messages received via the antenna array.

7. The apparatus of claim 6, wherein execution of the instructions further causes the apparatus to:
generate a smoothed AoA based at least in part on an average of the AoAs determined for the P Bluetooth wireless advertising messages.

8. The apparatus of claim 7, wherein the predetermined number P is selected to provide the smoothed AoA with an error of less than 20 degrees over a range of ±60 to ±70 degrees.

9. The apparatus of claim 1, wherein execution of the instructions further causes the apparatus to:

determine an AoA for each of a plurality of Bluetooth wireless advertising messages received during a time interval.

10. The apparatus of claim 9, wherein execution of the instructions further causes the apparatus to:
generate a smoothed AoA based at least in part on an average of the AoAs determined for the plurality of Bluetooth wireless advertising messages.

11. The apparatus of claim 1, wherein the first portion is sampled during a first time period and the second portion is sampled during a second time period following the first time period by a switching interval.

12. The apparatus of claim 11, wherein the first time period, the second time period, and the switching interval are equal in duration.

13. The apparatus of claim 12, wherein the first time period is a length of time to allow sampling of one bit of the Bluetooth wireless advertising message.

14. The apparatus of claim 1, wherein the known bit pattern corresponds to at least a portion of an advertising access address of the Bluetooth wireless advertising message.

15. A method of determining angle of arrival (AoA) of wireless signals received via an antenna array, the method comprising:
receiving a first number of bits of a Bluetooth wireless advertising message via a first antenna element of the antenna array;
receiving a second number of bits of the Bluetooth wireless advertising message via a second antenna element of the antenna array, wherein data corresponding to the second number of bits is different than data corresponding to the first number of bits;
sampling the first number of bits of the Bluetooth wireless advertising message received via the first antenna element to obtain a first sampled portion;
comparing the first sampled portion to a corresponding first number of bits of a Bluetooth advertising access address;
sampling the second number of bits of the Bluetooth wireless advertising message received via the second antenna element to obtain a second sampled portion;
comparing the second sampled portion to a corresponding second number of bits of the Bluetooth advertising access address;
determining a phase difference between the first and second sampled portions based on the comparisons; and
determining an AoA of the Bluetooth wireless advertising message based at least in part on the phase difference and a distance of separation between the first and second antenna elements.

16. The method of claim 15, wherein the Bluetooth wireless advertising message includes an 8-bit preamble and a 32-bit access address field, and wherein each of the first and second sampled portions comprises 16 bits of the access address field.

17. The method of claim 15, wherein the antenna array includes a number (N) of antenna elements spaced apart by the distance of separation, the method further comprising:
receiving the Bluetooth wireless advertising message via the N antenna elements;
determining a respective phase of the Bluetooth wireless advertising message received at each of the N antenna elements; and
determining the AoA of the Bluetooth wireless advertising message based at least in part on the respective phases and the distance of separation.

18. The method of claim 17, wherein determining the AoA of the Bluetooth wireless advertising message comprises:
mapping phase differences among the respective phases to an incident direction of the Bluetooth wireless advertising message.

19. The method of claim 18, wherein the AoA is determined based on a probability density function including at least one of a Gaussian or normal distribution, a hyperbolic distribution, or another suitable distribution that maps the phase differences and the distance of separation to the AoA.

20. The method of claim 19, further comprising:
determining an AoA for each of a predetermined number (P) of Bluetooth wireless advertising messages received via the antenna array; and
generating a smoothed AoA based at least in part on an average of the AoAs determined for the P Bluetooth wireless advertising messages.

* * * * *